Dec. 30, 1952     H. W. FURNALD     2,623,591
METHOD AND APPARATUS FOR INCREASING
THE TRACTION OF VEHICLE TIRE TREADS

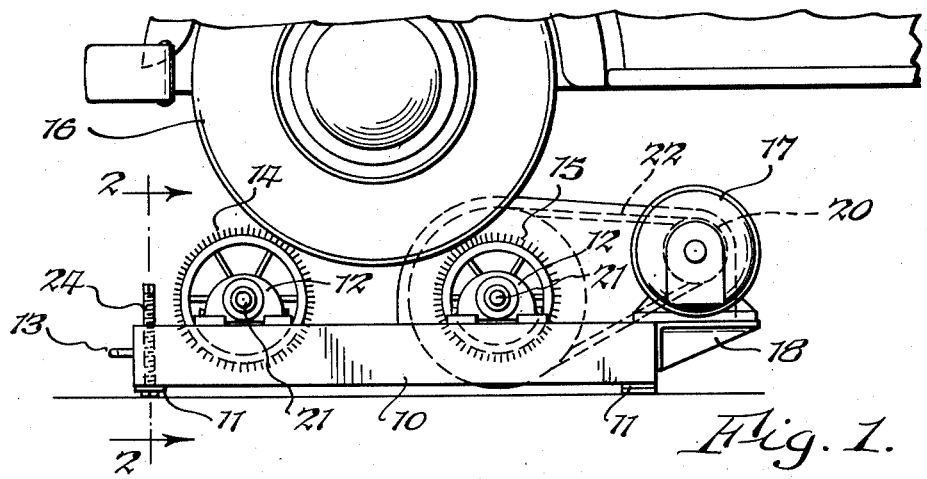
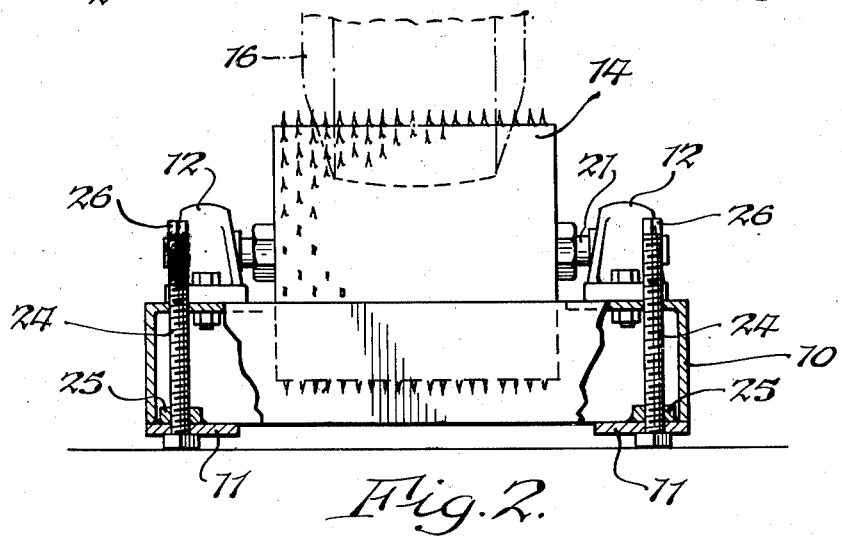
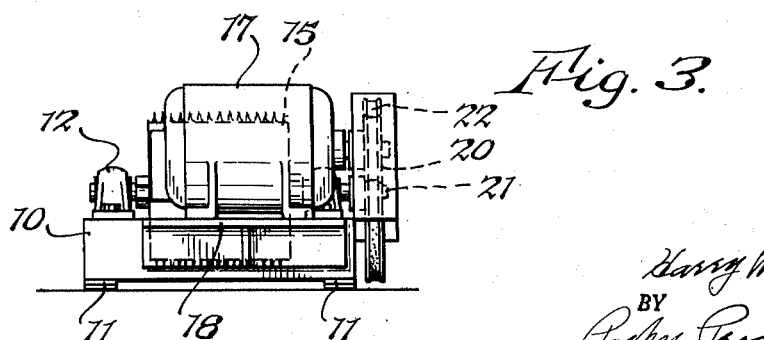

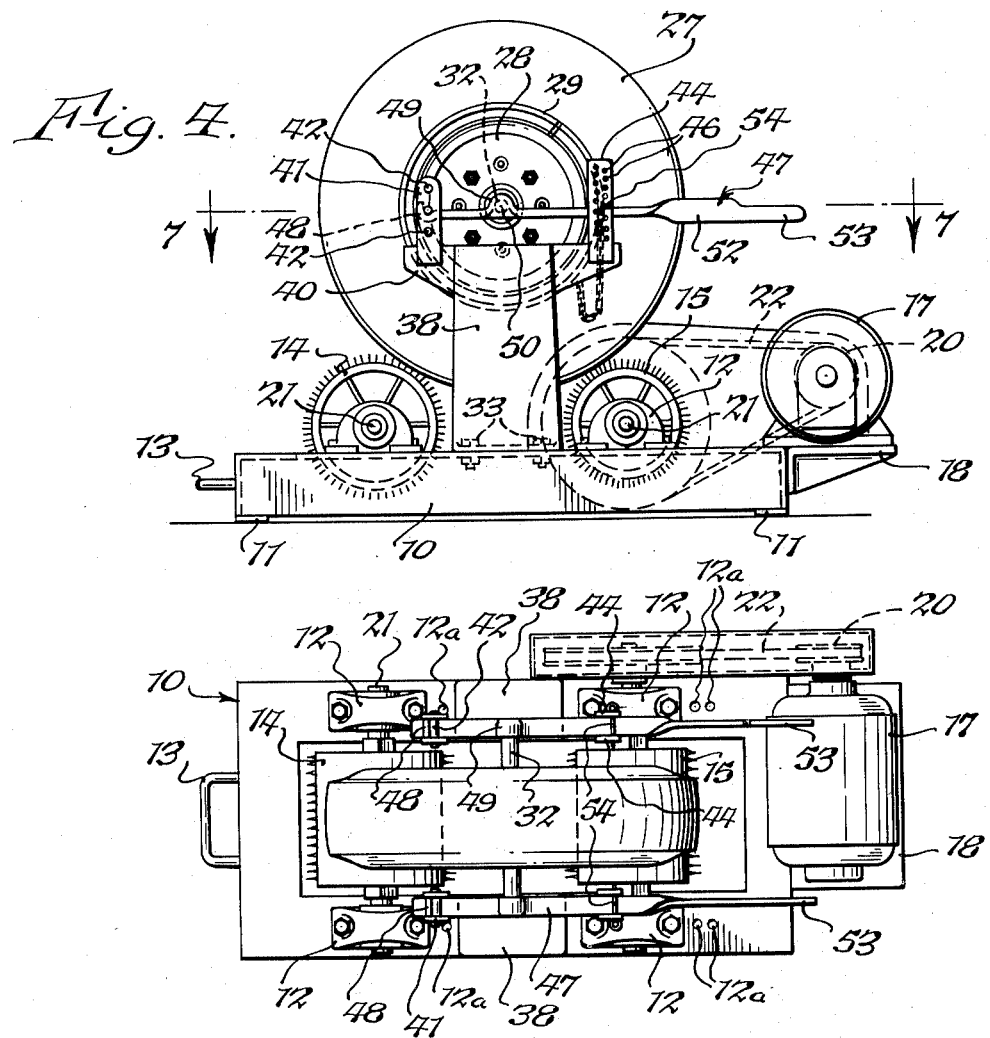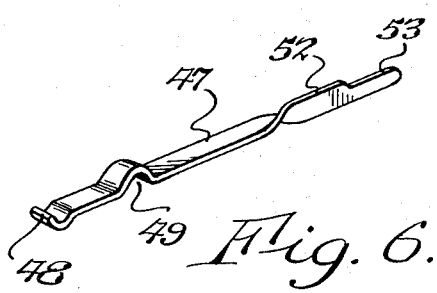

Filed March 23, 1951     3 Sheets-Sheet 3

INVENTOR.
Harry W. Furnald
BY
Parker, Brochman & Farmer,
Attorneys.

Patented Dec. 30, 1952

2,623,591

UNITED STATES PATENT OFFICE 2,623,591

METHOD AND APPARATUS FOR INCREASING THE TRACTION OF VEHICLE TIRE TREADS

Harry W. Furnald, Buffalo, N. Y.; Marie A. Furnald administratrix of said Harry W. Furnald, deceased Application March 23, 1951, Serial No. 217,131

16 Claims. (Cl. 164—86)

1

This invention relates to improvements in apparatus for use in connection with increasing the traction of vehicle tires by the roughening of treads of the tires for the purpose of enabling them to better resist slipping, skidding and the like.

Apparatus of this type generally comprises one or more rollers having a large number of prongs or projections on the surface which penetrate to a limited extent the tread of a tire when resting upon the rollers and rotated. These projections form a series of apertures or incisions which extend a short distance into the tread surface.

It has been found that when a single roller or two rollers of this type of the same size are used for making the apertures in the tire tread, the tendency of the prongs or projections on the rollers is, upon repeated rotation of the tire relatively to the rollers, to re-enter the same apertures or incisions previously made. This may be due to the rather tough and resilient nature of the rubber or rubber-like material from which the tires are made or to other causes. When this happens the number of perforations on a tire after treatment by the roller will be rather limited so that the tire does not have sufficiently increased traction to reduce slippage or skidding to the desired extent. For this reason, in connection with tire treating devices of this type as heretofore made, it is generally recommended by the manufacturer of such devices that the tires be subjected to two different treatments by these rollers, one with the tire inflated at normal air pressure and the other with the tire inflated at approximately double the normal air pressure. At the higher pressure the diameter or shape of the tread of the tire is changed sufficiently so that the prongs or projections of the two rollers will form different apertures in the tire than those formed when the air pressure in the tire is normal.

One of the objects of this invention is to provide a tire treating device of this type which is so constructed that two different patterns of apertures or incisions are made in the tire at one time without changing the air pressure in the tire, thus effecting a material saving of time in the treatment of a tire.

Another object is to provide an improved method of treating tire treads to improve the traction thereof.

A further object is to provide tire treating apparatus of this type which includes a pair of treating rollers which simultaneously engage the tire tread, and which are of different diameters.

2

It is also an object of this invention to provide an apparatus of this type which is so constructed as to reduce the power required to treat a tire.

Another object of this invention is to provide a tire treating device which is so constructed that it may be raised to engage a tire of a vehicle which has been jacked up.

A further object is to provide an apparatus which may be utilized for treating tires detached from vehicles.

Other objects and advantages will be apparent from the following description of one embodiment of the invention and the novel features will be particularly pointed out hereinafter in connection with the appended claims.

In the accompanying drawings:

Fig. 1 is a side elevation of a tire treating apparatus embodying this invention showing how the same may be applied to a tire of a motor vehicle, which is partly shown.

Fig. 2 is a sectional elevation thereof, on a larger scale, on line 2—2, Fig. 1.

Fig. 3 is an end view thereof, as seen from the right in Fig. 1.

Fig. 4 is a side elevation of a tire treating apparatus of modified construction for use in treating tires when the same are detached from a vehicle.

Fig. 5 is a top plan view thereof.

Fig. 6 is a perspective view of one of the levers for forcing a tire into engagement with the tire treating rolls of the apparatus.

Figure 7:
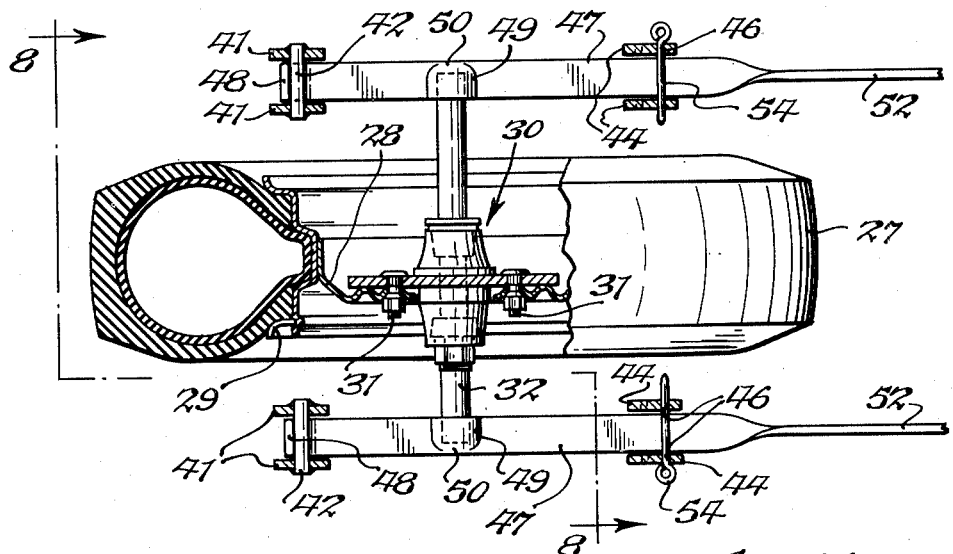
Fig. 7 is a fragmentary, sectional plan view thereof, on an enlarged scale, on line 7—7, Fig. 4.

The apparatus shown in the drawings by way of example includes a base 10 of any suitable form, that shown being in the form of a hollow rectangle and made of four angle bars welded together at the corners of the base. The angle bars are preferably arranged so that one leg of each extends horizontally at the upper portion of the base, and to reinforce the lower portion of the frame I preferably weld corner pieces 11 of substantially triangular form to the corners of the angle bars. These triangular pieces have the further advantage that they form feet on which the base member rests. 13 represents a handle by means of which the apparatus is conveniently moved along the floor.

The upper legs of the angle bars of the base support bearing pedestals 12 bolted thereto and in which the shafts of a pair of tire treating rolls 14 and 15 are journalled. These rolls are provided with outwardly projecting prongs or pointed projections and the rolls may be of any suitable or desired construction, for example, as shown in my copending application, Serial No. 139,102, filed January 17, 1950, or of any other suitable or desired construction. The rolls preferably have the prongs or projections closely spaced about their peripheries, but for the sake of clarity, some of the projections are omitted from Figs. 2, 3, 5 and 8. The two rolls 14 and 15 are spaced apart sufficiently so as to support or cradle a vulcanized tire 16 of a vehicle between them and preferably a plurality of holes 12a, Fig. 5, are provided in the upper flanges of the side angle bars of the base 10 so that the bearing pedestals 12 may be bolted to the base at different distances from each other to cooperate with tires of different diameters.

If the tire treating apparatus is to be applied to a rear wheel of a vehicle, the desired treatment of the tires can be accomplished by rotating the wheel while its tire rests on the rolls 14 and 15 by means of the engine of the vehicle. If it is desired to treat a tire of a wheel which cannot be driven from the engine, for example, a tire of a front wheel or of a trailer, a suitable driving motor may be provided to drive either of the two rolls 14 or 15, and in the construction shown for this purpose, an electric motor 17 is provided which is mounted on a bracket 18 secured to one end of the frame 10. It will be obvious that any other driving device may be provided in place of the electric motor shown, such for example as an internal combustion engine. The shaft of the motor may be provided with a suitable pulley 20 and another pulley may be provided on the shaft 21 of either roll. A belt 22 may connect the two pulleys. In order to minimize the power required to operate the apparatus, the motor is preferably connected by means of the belt 22 to the smaller of the two rolls. The pulleys and belts shown are of the V-type. Any other driving connection between the motor and one of the rolls may be provided.

It will be noted, particularly in Fig. 1, that the two rolls 14 and 15 are of different diameters, the roll 14 in the construction shown being of larger diameter than the roll 15. This constitutes an important advantage of the tire treating apparatus for the reason that it has been found that if the two rolls are of the same diameter, there is a tendency for the prongs or projections on one of the rolls to enter into the holes or incisions made by the prongs or projections of the other roll. It is desirable, of course, to provide the tire with the maximum number of holes or incisions to increase the traction of the tire on slippery surfaces. The nature of the rubber or rubber-like material used on tire treads is sufficiently flexible and resilient so that if a prong or projection contacts the tire in fairly close proximity to a hole or recess which has already been formed in the tire, the rubber will flex or yield sufficiently to enable a prong or projection to enter into a hole or recess which has already been formed. This, consequently, defeats the purpose of providing as many holes or recesses in the tire as possible. In order to overcome this objection, it has heretofore been recommended that a tire be treated on apparatus, as hereinbefore stated. I have found that the same result can be accomplished by providing rolls of two different diameters. When rolls of two different diameters are used, I have found that the tendency of the prongs or projections of one roll to enter the recesses or incisions already formed in the tire by the other roll is overcome and that the prongs on one roll will tend to form new holes or recesses. This has the advantage that the time required for treatment of a tire is very greatly reduced since incisions in the tire tread are made by each wheel independently of each other and in one operation, and that the operations of inflating a tire to a higher pressure and then again reducing the pressure are entirely eliminated. I have found, for example, that for smaller tires, if one of the rolls is about nine inches in diameter and the other roll eight inches in diameter and for larger tires, the rolls are nine inches and ten and one-half inches, the results obtained are very superior to those obtained if the two rolls are of the same diameter. Other dimensions for the rolls may, of course, be used.

In the use of the apparatus thus far described, and as shown in Figs. 1 to 3, the tire 16 to be treated may be applied to the rolls in any suitable or desired manner. If desired, the car may be jacked up sufficiently to permit the apparatus to be placed under a tire and the vehicle may then be lowered so that all or a part of the weight of the tire will be on the drums 14 and 15. However, with heavy vehicles, such as trucks or busses, it is desirable to provide means for raising the frame member 10 after the vehicle has been jacked up and after the apparatus has been placed under the tire to be treated. This can be accomplished, for example, by providing at the two corners of one end of the frame member a pair of screws or bolts 24, each of which has a threaded engagement with the base, for example, with a nut 25 welded or otherwise secured to the upper surface of the reinforcing or foot members of the frame. The top flanges of the angle are provided with apertures of sufficient sizes to permit the bolt to extend freely through the same. The upper end of the bolt is provided with an end portion 26 of non-circular cross section which may be turned by means of a wrench or other implement to permit the end of the frame to be raised or lowered so that the rolls 14 and 15 may be drawn into engagement with the tire to the desired extent. This construction has the advantage that the motor driving one of the rolls may be started before the frame 10 is raised. Consequently, by means of this construction a motor of smaller horse power may be employed for treating the tires than would be the case if the motor were required to start the operation of the apparatus while the rolls are in operative relation to the tire. Any other means for raising the frame 10 may, of course, be used, if desired, and if no frame-raising means are desired, the bolts 24 may be readily unscrewed from the frame and removed.

It is frequently desirable to treat tires not mounted on vehicles, so that the weight of the vehicle cannot be used for forcing the projections into the tread. For example, new tires before they are mounted on wheels, may be treated by means of the apparatus by adding to the same an attachment as shown in Figs. 4 to 8. In this construction, 27 represents a tire detached from a vehicle and to be treated. For this purpose, I preferably provide a wheel 28, which is so formed that the tire 27 with a tube therein can readily be applied thereto. As shown in Fig. 7, this wheel has a rim with a fixed flange at one side thereof and with a removable split ring 29 at the other side. The rim is of sufficient width between the fixed flange and the split ring so as to accommodate tires of different sizes, but of the same inside diameter. The tires may, for example, vary in transverse dimensions from about six inches to nine inches. This wheel is demountably secured on a suitable hub 30 of any usual construction by means of bolts 31. For tires of different inside diameters, similar wheels 28 but of different diameters are employed which may be mounted on the hub by means of the bolts 31. The hub is mounted by means of any usual or suitable bearings on a shaft or axle 32.

Figure 8:
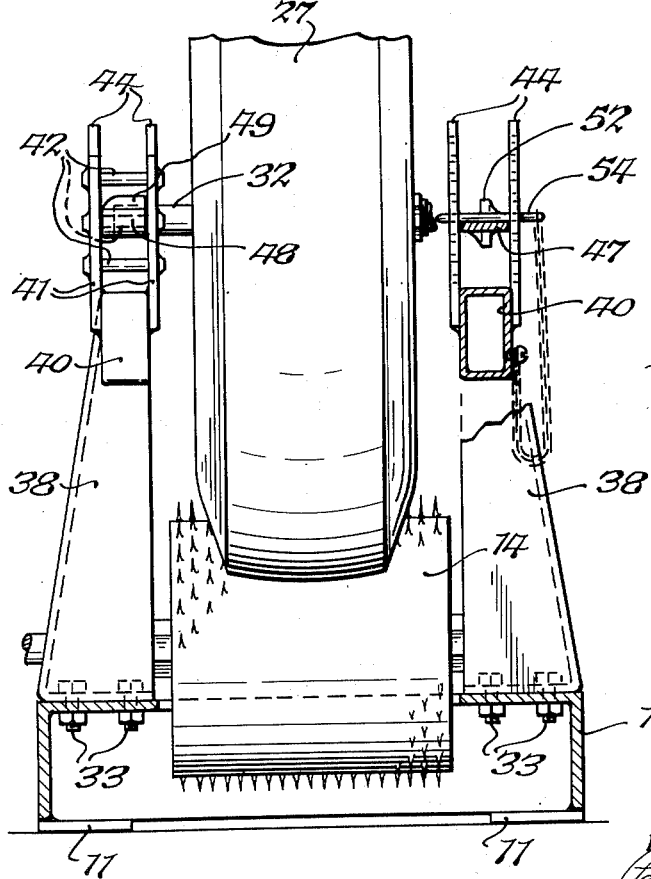
Fig. 8 is an end elevation thereof, on a still larger scale, partly in section on line 8—8, Fig. 7.

Any suitable or desired construction may be employed for applying pressure to the opposite ends of the shaft or axle 32 for urging the tire 27 into engagement with the rolls 14 and 15, and in the construction shown for this purpose, I have provided a pair of upwardly extending pillars or standards 38, the lower ends of which are rigidly but removably secured, for example, by means of bolts 33, to the upper flanges of the angle bars of the frame member 10. One of these pillars is provided at each side of the frame member and extends upwardly to a distance somewhat below the shaft 32. Each of the pillars or standards 38 is provided at the upper end thereof with a cross member or yoke 40 which is rigidly secured thereto and which may, for example, be of rectangular cross section, as shown in Fig. 8. Each of these yoke members is provided at one end with a pair of upwardly extending arms 41, the lower ends of which are rigidly secured to opposite sides of the neck 40. Each pair of posts is connected by means of a plurality of transversely extending pins 42 which may be welded or otherwise secured to the arms 41 of the yoke member. The other end of each yoke member is provided with a pair of upwardly extending arms or plates 44 rigidly secured thereto and provided with a relatively large number of registering apertures 46, as clearly shown in Fig. 4.

In order to press a tire down against the rolls 14 and 15, I provide a pair of levers 47, each of which is formed to extend between two pairs of upwardly extending arms or members 41 and 44 and each of which engages one end of the shaft or axle 32. Each lever is provided at one end thereof with a semi-cylindrical or hook portion 48 formed to engage with a cross bar 42. Each lever is also provided with oppositely curved, substantially semi-cylindrical recesses or parts 49 formed to engage an end of the shaft 32. One end of the recess is preferably closed or terminates in an upright wall 50 formed to engage an end of the shaft 32 to hold the wheel to be treated in correct relation to the apparatus. Each lever is also provided with a part 52 which extends between the upwardly projecting arms 44, and the outer end of the lever may be provided with a handle portion 53.

In the use of these levers to press the tire 30 against the rolls 14 and 15, the cylindrical portion 48 of the lever is hooked under the transversely extending pin 42 and the semi-cylindrical portion 49 is engaged with an end of the shaft 32. After the desired downward pressure has been applied to the handle portions 53 of the levers, cross pins 54 may be inserted through registering holes 46 above the parts 52 of the levers so that when pressure is released from the outer ends of the levers, the pin 54 will hold the levers in such adjusted positions. Preferably the motor is started before pressure is applied to the levers so that the starting torque on the motor will not be excessive. It will be obvious that when the tire is pressed against the rolls 14 and 15 with the desired pressure by means of the levers, the tire will be provided with numerous small incisions in the same manner as described in connection with Figs. 1 to 3.

The apparatus described may be built in different sizes, for example, one for passenger cars and one for heavy trucks, trailers, or the like. However, a single apparatus of any size may be employed for the treatment of tires under all of the conditions herein described. For treating tires when the power of the engine of the vehicle is used for rotating the tire to be treated while resting on the rolls, the belt connecting the motor with one of the rolls may be removed. When any tires mounted on vehicles are being treated, the standards or pillars 38 are removed from the base by merely removing the bolts 33.

While I have shown my improved method and apparatus as applied to pneumatic tires, it will be obvious that the method and apparatus may be used equally well on solid tires of rubber or rubber-like material.

In carrying out my improved method for treating tire treads, I press a tire tread against the surfaces of a pair of rolls of the type described and of different diameters while the tire and the rolls are simultaneously rotating. The two rolls of different diameters, consequently, rotate at different speeds of rotation and form perforations or incisions in the tread independently of each other so that a greater number of incisions is formed in the tread than in the case where the two rolls are of the same diameter. In effect, by means of my improved method, I simultaneously subject the tire tread to two treatments.

The apparatus described has the advantage that it is of simple and inexpensive construction and may be applied to wheels and tires of any size. The rolls, of course, may be rotated for any desired length of time, but ordinarily, if the tire is applied with the necessary pressure against the rolls, three minutes of rotation will be ample to form the desired number of holes or incisions in the tread portion of the tire to resist slipping or skidding to the maximum extent, and because of the difference in diameters of the rolls 14 and 15, one treatment for this period of time is sufficient. The apparatus is economical in the use of power, by connecting the motor with the smaller of the two rolls, and when treating large tires, by raising the apparatus into operative relation to the tire while the motor is running.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. Apparatus for increasing the traction of a vulcanized tire tread, comprising a base and a pair of rolls rotatably mounted on said base and each having a multiplicity of projections extending outwardly from the same for penetrating the tread of a tire, said rolls being of different diameters and being spaced apart to simultaneously engage the tread of a tire, whereby the projections of one roll will engage different parts of said tread than the projections of the other roll.

2. Apparatus for increasing the traction of a vulcanized tire tread, comprising a base and a pair of rolls rotatably mounted on said base and each having a multiplicity of projections extending outwardly from the same for penetrating the tread of a tire, said rolls being spaced apart to simultaneously engage different portions of the tread of a tire, said rolls being of different diameters and rotating at different speeds when engaging a tire, to cause the projections of each roll to make different incisions in the tire tread.

3. The method of increasing the traction of a vulcanized tire tread, which comprises forming a large number of small incisions in the tire tread by pressing the tire tread while rotating against a pair of rolls of different diameters and each having pointed projections which penetrate the tire tread to make the incisions therein in different portions thereof.

4. Apparatus for increasing the traction of a vulcanized tire tread, comprising a base and a pair of rolls rotatably mounted on said base and each having a multiplicity of projections extending outwardly from the same for penetrating the tread of a tire, said rolls being of different diameters and being spaced apart to simultaneously engage the tread of a tire, and a motor for imparting rotation to the roll of smaller diameter.

5. In a method of increasing the traction of a vulcanized tire of a wheel mounted on a vehicle which comprises placing under the tire while the same is jacked up an apparatus including a roll having pointed projections and mounted for engagement with the tire, and a motor for driving said roll, that improvement which includes controlling the depth of penetration of said projection into the tire by raising said apparatus into a position in which said projections penetrate the tire tread to the desired extent, and rotating said roll by said motor while said apparatus is being raised.

6. Apparatus for increasing the traction of a vulcanized tire of a wheel mounted on a vehicle while the tire of the vehicle is jacked up, said apparatus including a base having a roll rotatably mounted thereon, said roll having a multiplicity of projections extending outwardly from the same for penetrating the tread of a tire, a motor for rotating said roll, and means for elevating said roll into operative engagement with the tread of said tire.

7. Apparatus for increasing the traction of a vulcanized tire of a wheel mounted on a vehicle while the tire of the vehicle is jacked up, said apparatus including a base having a pair of rolls rotatably mounted thereon, each of said rolls having a multiplicity of projections extending outwardly from the same for penetrating the tread of a tire while said rolls are rotating at substantially the same peripheral speed as the tire and about substantially parallel axes, a motor for rotating one of said rolls, and means secured to said base for elevating the same to move said rolls into position in which said projections penetrate said tire.

8. Apparatus according to claim 7, in which said elevating means comprise a pair of screws having a threaded engagement with one end of said base for swinging said base upwardly about the other end thereof to move said projections into penetrating relation to the tire tread.

9. Apparatus for increasing the traction of a vulcanized tire tread, said apparatus comprising a base, a pair of rolls rotatably mounted on said base and each having a multiplicity of projections extending outwardly from the same for penetrating the tread of a tire, said rolls being spaced apart to simultaneously engage the tread of a tire, power actuated means for imparting rotation to one of said rolls, a wheel on which said tire is mounted, and an axle on which said wheel is rotatably mounted, and means on said apparatus for engaging said axle and urging the same in a direction to cause the tread of said tire to engage said projections of said roll.

10. Apparatus according to claim 9, in which said rolls are of different external diameters.

11. Apparatus for increasing the traction of a vulcanized tire tread, said apparatus comprising a base, a pair of rolls rotatably mounted on said base and each having a multiplicity of projections extending outwardly from the same for penetrating the tread of a tire, said rolls being spaced apart to simultaneously engage the tread of a tire at different portions of the tread, power actuated means for imparting rotation to one of said rolls, a wheel on which said tire is mounted, and an axle on which said wheel is rotatably mounted, a pair of standards extending upwardly from said base, and means mounted on said standards and engaging opposite ends of said shaft for urging said shaft and said tire toward said rolls.

12. Apparatus for increasing the traction of a vulcanized tire tread, said apparatus comprising a base, a pair of rolls rotatably mounted on said base and each having a multiplicity of projections extending outwardly from the same for penetrating the tread of a tire, said rolls being spaced apart to simultaneously engage the tread of a tire, power actuated means for imparting rotation to one of said rolls, a wheel on which said tire is mounted, and an axle on which said wheel is rotatably mounted, a pair of standards extending upwardly from said base, parts engaging the opposite ends of said shaft when said tire is placed on said rolls, and means for urging said parts downwardly to press said tire tread against said rolls.

13. Apparatus for increasing the traction of a vulcanized tire tread, said apparatus comprising a base, a pair of rolls rotatably mounted on said base and each having a multiplicity of projections extending outwardly from the same for penetrating the tread of a tire, said rolls being spaced apart to simultaneously engage the tread of a tire, power actuated means for imparting rotation to one of said rolls, a wheel on which said tire is mounted, and an axle on which said wheel is rotatably mounted, a pair of standards extending upwardly from said base at opposite sides of said rolls, a pair of levers pivotally mounted on said standards and each having a part formed to engage a portion of said shaft for moving said shaft and said tire tread downwardly into a position in which said tire tread is penetrated by said projections of said rolls.

14. Apparatus according to claim 13, and which includes holding means movable into engagement with said levers when in depressed positions, for holding said levers in positions in which said projections penetrate the tread of the tire.

15. Apparatus for increasing the traction of a vulcanized tire tread, said apparatus comprising a base, a pair of rolls rotatably mounted on said base and each having a multiplicity of projections extending outwardly from the same for penetrating the tread of a tire, said rolls being of different external diameters, power operated means for rotating the roll of smaller diameter, and mechanism mounted on said base for forcing said tire tread into engagement with said projections to cause said projections to penetrate the tire tread.

16. Apparatus for increasing the traction of a vulcanized tire tread, said apparatus comprising a base, a roll rotatably mounted on said base and having a multiplicity of sharp projections extending outwardly from the same for penetrating the tread of the tire, power operated means for rotating said roll, and mechanism mounted on said base for forcing said tire tread into engagement with said projections to cause said projections to penetrate the tire tread.

HARRY W. FURNALD.

REFERENCES CITED

The following references are of record in the file of this patent:

UNITED STATES PATENTS

| Number | Name | Date |
|---|---|---|
| 2,271,130 | Pearson | Jan. 27, 1942 |
| 2,366,685 | Chambers | Jan. 2, 1945 |
| 2,504,090 | Sanderson | Apr. 11, 1950 |